United States Patent [19]

Wright

[11] 3,729,757
[45] May 1, 1973

[54] SELF-LOCKING NUT

[75] Inventor: Thomas B. Wright, Diamond Bar, Calif.

[73] Assignee: TRW Inc., Cleveland, Ohio

[22] Filed: Jan. 13, 1972

[21] Appl. No.: 217,682

Related U.S. Application Data

[63] Continuation of Ser. No. 12,801, Feb. 19, 1970, abandoned.

[52] U.S. Cl. ................................10/86 A, 151/21 B
[51] Int. Cl. .............................................B21d 53/24
[58] Field of Search .....................10/86 R, 86 A; 151/21 B, 21 C, 22

[56] References Cited

UNITED STATES PATENTS

| 1,966,613 | 7/1934 | Cole | 10/86 A |
| 2,279,388 | 4/1942 | Cox | 10/86 A |
| 2,370,352 | 2/1945 | Hosking | 151/22 |
| 3,145,751 | 8/1964 | Boots | 151/21 B |

*Primary Examiner*—Charles W. Lanham
*Assistant Examiner*—E. M. Combs
*Attorney*—Gordon Needleman

[57] ABSTRACT

This is a lock nut which is formed into a generally elliptical configuration or triangular configuration having arcuate walls, is then tapped and the resulting configuration is then further distorted.

1 Claim, 6 Drawing Figures

Patented May 1, 1973  3,729,757

INVENTOR
THOMAS B. WRIGH
BY
ATTORNEY

SELF-LOCKING NUT

This is a continuation, of application Ser. No. 12,801, filed Feb. 19, 1970, now abandoned.

BACKGROUND OF THE INVENTION

1. Field of the Invention

A basic requirement for self-locking nuts having on-off cycles with a bolt is approximately fifteen cycles. Most lock nuts do not greatly exceed this requirement and as a matter of fact the maximum number of cycles would be approximately 50.

The most popular method of forming a lock nut is to tap a drawn cylinder and then form it into an elliptical shape. The nut is then hardened to spring temper. When a screw or bolt is engaged with the nut it forces the nut into a shape resembling the original round shape with resulting locking torque. This action is however quite harsh so that the screw and/or the nut wears rather rapidly, diminishing the amount of torque after each use. It is believed that the nut disclosed herein should be capable of many hundreds of cycles within the permitted torque range. It will probably range from a minimum of three hundred to a possible maximum of one thousand cycles.

Superior performance is also expected from the disclosed configuration because the walls of the nut should act more effectively as a spring with a lesser differential in force between the extremes of the fully installed condition and the free position.

2. Description of the Prior Art

There are several ways of deforming nuts to provide a locking action. The patent to Hosking U.S. Pat. No. 2,370,352 discloses a nut which is formed before and after tapping. The Hosking device deforms the lip of a tubular extension in one direction, taps the extension and then squeezes the opposite walls (i.e. those at right angles to the original compressed walls). In this case the two deformations are not additive so that in Hosking the thicker wall grips the bolt.

The Evans U.S. Pat. No. 3,353,581 is directed at a nut which is formed into a generally triangular configuration prior to tapping. In this case there is no second distortion whatsoever.

There is a group of patents which disclose nuts that are deformed after tapping. Some examples of patents in this group are the patents to Reiner U.S. Pat. Nos. 2,816,591; Beford Jr., 2,846,701; Skidmore 2,923,339; Boots 3,145,751; and Dwyer 3,277,942.

SUMMARY OF THE INVENTION

An object of the present invention is to provide a lock nut which has been additively distorted.

A further object of the present invention is to provide a nut which has its aperture formed in a generally triangular configuration which is then tapped.

A still further object of the present invention is to provide a triangular lock nut which is then tapped and finally distorted.

DESCRIPTION OF THE PREFERRED EMBODIMENT

Figure 1:
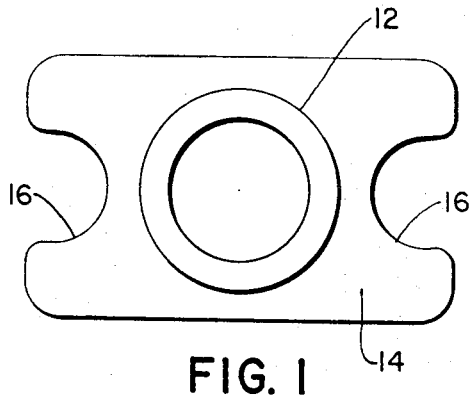
FIG. 1 is a top plan view of the blank of the first embodiment.
Figure 2:
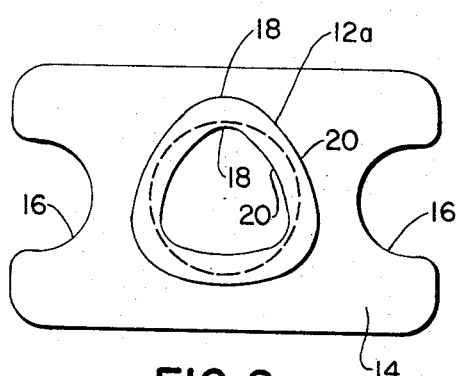
FIG. 2 is a top plan view of the lock nut after the first distortion and tapping.
Figure 3:
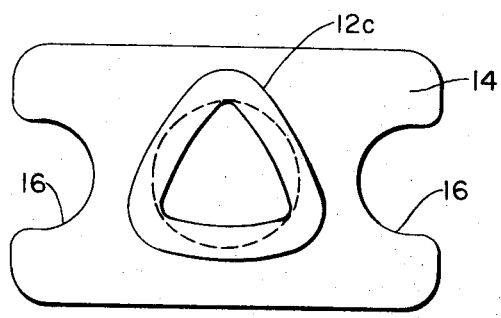
FIG. 3 is a top plan view of the lock nut after the second distortion.
Figure 4:
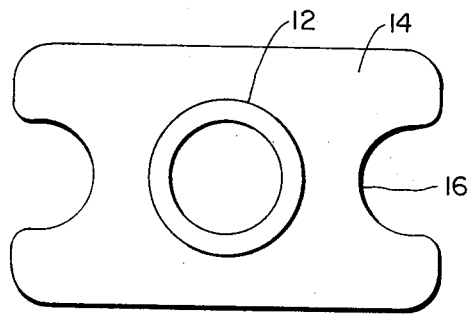
FIG. 4 is a top plan view of the blank of the second embodiment.
Figure 5:
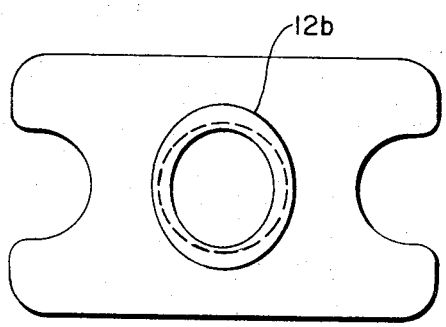
FIG. 5 is a top plan view of the lock nut of the second embodiment after distortion and tapping.
Figure 6:
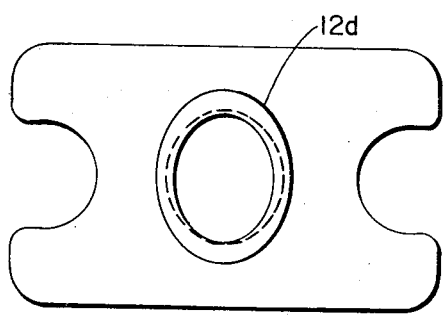
FIG. 6 is a top plan view of the lock nut of the second embodiment after second distortion.

There is shown in the drawings a blank comprising a tubular unthreaded sleeve 12 with an integral rectangular flange 14 extending outwardly at substantially right tangles at an end thereof. The blank may be drawn or formed in any other well known way. The internal diameter of the sleeve 12 is larger than a standard nut internal diameter by a predetermined amount. Notches 12 are cut into each of the short sides of the flange 14. The tubular sleeve 12 is subjected to a three jaw chuck which squeezes it for the major portion of its height into the form of a triangle 12a or using two jaws into an elliptical shape 12b. The shaped sleeve 12a or 12b is then threaded by an axial tap which cuts the inner wall deeper in some places as at 18—18 and less deep in other places such as at 20—20. Consequently the threads are somewhat truncated and blunt edged as at 18—18 and quite sharp and full at other places such as 20—20. This threading operation is performed through the major portion of the height of the sleeve 12. Note that more material is removed at 20—20 thereby thinning the wall at that point and increasing the wall flexibility. In other words the thread thus formed is a continuous thread which is of full depth at the center of the lands and which is of gradually decreasing depth in either direction therefrom reaching a minimum depth at the apex of the floats or lobes of the triangles.

After the sleeve has been threaded it is again deformed by squeezing the sides in again with a three jaw chuck if triangular as at 12c and with a two jaw chuck if elliptical as at 12d. The distortion of the elliptical configuration occurs on the major arcs of the nut. This second distortion imparts the locking features.

I claim:

1. A method of forming a self-locking nut comprising: (a) forming a cylindrical barrel from a sheet metal blank; (b) squeezing the barrel over substantially its entire length to distort the same into an intermediate form having a noncircular transverse cross-sectional configuration; (c) tapping the barrel in said intermediate form to provide a continuous thread of constantly varying effective depth along each convolution thereof; and (d) squeezing the barrel a second time to distort the same into a final form having the same basic geometric transverse, cross-sectional configuration as the second form but deviating appreciably further from the original cylindrical configuration than the second form and having a substantially more pronounced variation in effective thread depth than the intermediate form.

* * * * *